United States Patent [19]

Akiyama et al.

[11] 4,329,104

[45] May 11, 1982

[54] CARGO HANDLING APPARATUS

[75] Inventors: Seiji Akiyama, Yokohama; Mamoru Kurihara, Koganei; Kazuhiko Ueki, Mitaka, all of Japan

[73] Assignee: Mitsubishi Jukogyo Kabushiki Kaisha, Tokyo, Japan

[21] Appl. No.: 74,403

[22] Filed: Sep. 10, 1979

[51] Int. Cl.³ .............................................. B63B 27/00
[52] U.S. Cl. ................................... 414/139; 104/183; 212/189; 414/399
[58] Field of Search .............. 212/209, 190, 191, 192, 212/193, 194, 189; 414/347, 392, 137, 138, 139, 140, 786, 595, 609, 399; 104/183

[56] References Cited

U.S. PATENT DOCUMENTS

| 3,168,955 | 2/1965 | Black | 414/140 X |
| 3,543,952 | 12/1970 | Young | 414/139 |
| 3,687,307 | 8/1972 | Macrander et al. | 414/137 |
| 4,049,131 | 9/1977 | Schrader et al. | 414/139 |
| 4,106,639 | 8/1978 | Montgomery et al. | 414/139 |

FOREIGN PATENT DOCUMENTS 501005 10/1976 U.S.S.R. .............................. 414/138

*Primary Examiner*—Leslie J. Paperner
*Attorney, Agent, or Firm*—Wenderoth, Lind & Ponack

[57] ABSTRACT

An improved cargo handling apparatus is described herein, which includes a crane truck, adapted to travel along a wharf sloped surface and to be fixedly positioned in the proximity of a mooring position of a ship for the loading or unloading of cargoes, and a cargo transportation truck or trucks adapted to travel along a path parallel and adjacent to the path of the crane truck between a crane positioned on the shore side of the wharf and the fixed positioned location of the crane truck.

10 Claims, 7 Drawing Figures

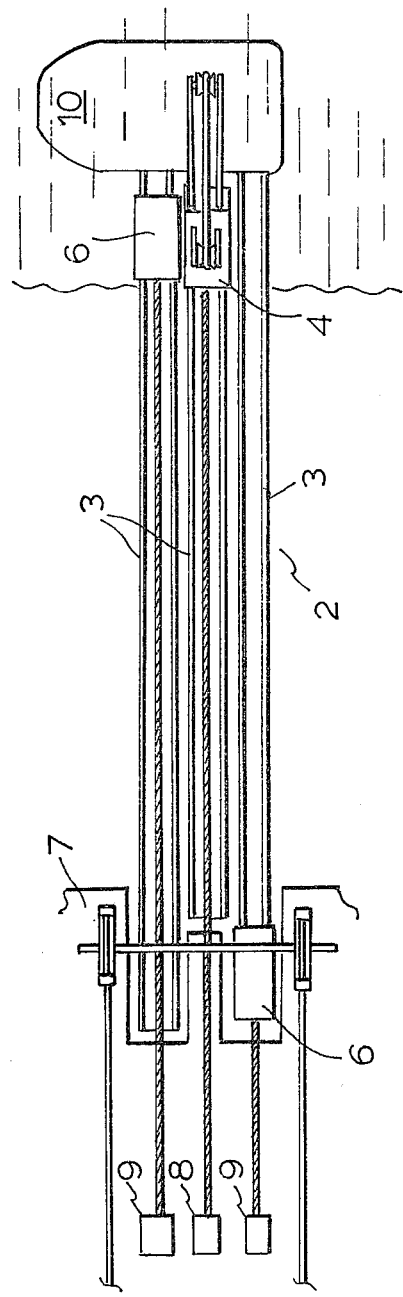
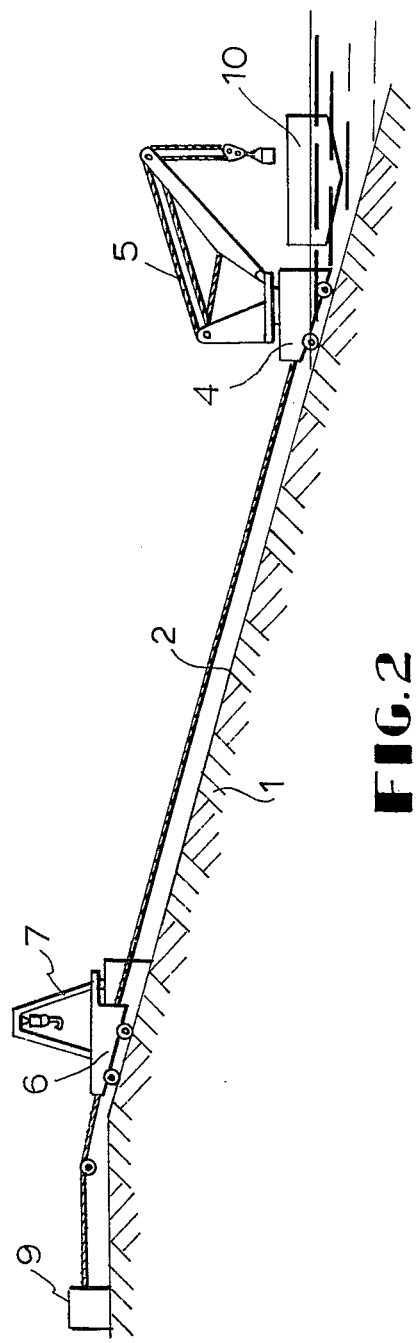

CARGO HANDLING APPARATUS

BACKGROUND OF THE INVENTION

The present invention relates to a cargo handling equipment located adjacent to a berth for ships or the like where in the variation of the water level is substantially large and an associated wharf has a sloped surface which is downwardly inclined in the direction of the offshore.

Heretofore, handling of general ship cargoes except for powder or granular materials or regular shape cargoes has been effected by making use of cranes located directly on a wharf or directly on a pier or cranes located directly on a ship.

In the utilization of such cranes, there is the disadvantages that if the water level varied substantially, the lift potential of the crane becomes substantially impaired resulting in a degradation of cargo handling efficiency and also the cargo is dangerously exposed to a loss of stability due to the wind.

Accordingly, one method of obviating the aforementioned disadvantages, is to use barges in conjunction with the use of an expansible and contractible pier located or a floating pier between a barge and the shore.

In the above-mentioned case, not only is the construction expense of a pier large, but in view of the fact that the barge is unstable and would move up and down or tilt in accordance with variations of loading thereon and or variations of the flow direction and speed of water caused by tides or the like, the use of barges is limited, and therefore, the operation of cargo handling equipment associated therewith is not always satisfactory where a variation of water level such as, for example, a difference of water level between the high and low tides is substantial.

The present invention has been developed in view of the abovedescribed disadvantages of the prior art.

One object of the present invention to provide a cargo handling apparatus which functions so as to eliminate the disadvantages of the cargo handling equipment of the prior art while being very simple construction.

According to one feature of the present invention, there is provided cargo handling apparatus comprising a crane truck, adapted to travel in a path along a wharf having a sloped surface and to be fixedly positioned in the proximity of a mooring position of a ship for the loading or unloading of cargoes, and a cargo transportation truck or trucks adapted to travel in a path parallel and adjacent to the path of the crane truck on one side or both sides thereof which extends between a crane positioned on the shore side of the wharf sloping surface and the crane truck fixedly positioned adjacent the ship.

According to the present invention, since the cargo handling apparatus is constructed as described above and since the cargo handling apparatus operates in such manner, such that after the crane truck has traveled along the wharf sloped surface and has been fixedly positioned in the proximity of the mooring position of the ship or the like which is maintained position corresponding to a water level at that time, the cargo transportation truck or trucks of the present invention travels along the path adjacent to path of the crane truck on one side or both sides thereof between the shore crane and the crane truck, however since the water level may change, the crane truck is adapted to be moved and fixedly set at a position corresponding to the proximity of the mooring position of the ship or the like which is determined as a function of the water level.

Therefore, even if the water level changes substantially due to the high and low tides or the like resulting in a large shift of the mooring position of the ship or the like according to the present invention, the cargo handling work can be achieved at a high efficiency with a cargo handling apparatus having a very simple construction, and which can function without being substantially affected by variations in water level between the high and low tides. Also the cargo handling apparatus according to the present invention is not as expensive in construction cost as compared to the cargo handling equipment of the prior art.

BRIEF DESCRIPTION OF THE DRAWINGS

The above-mentioned and other features and advantages of the present invention will become more apparent when considered the following specification in conjunction with the accompanying drawings, wherein:

FIG. 1 is a schematic plain view showing one preferred embodiment according to the present invention, FIG. 2 is a side view of the embodiment of FIG. 1.

DETAILED DESCRIPTION OF THE PREFERRED EMBODIMENT

Figure 3:
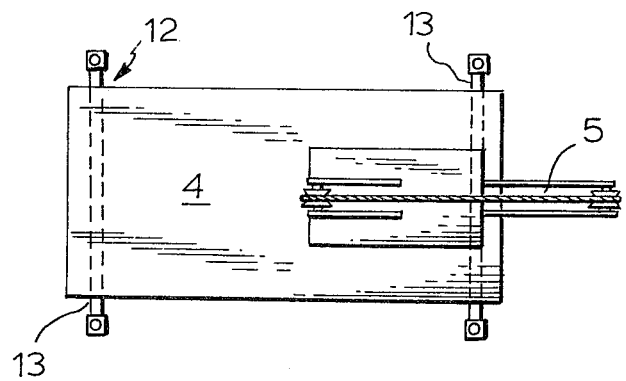
FIG. 3 is a plain view of a crane truck according to the present invention.

Referring now to FIGS. 1 and 2, reference numeral 1 designates a wharf which is located adjacent to a body of water at a river side or a seaside and has a sloped surface rising in elevation from the shore towards the offshore. On the sloped surface of the wharf are formed paths 2 for a crane truck 4 and cargo transportation trucks 6 which will be described later, and each path 2 has two rails 3, as shown in FIG. 1. The crane truck 4 has a crane 5 mounted thereon and is adapted to run along the rails 3 by means of a winch 8. The cargo transportation trucks 6 are disposed on the respective sides of the crane truck 4 and are made to run along the rails 3 by means of respective winches 9. Reference numeral 7 designates a known shore crane installation at a truck yard or the like located adjacent to the shore side of the wharf 1, and reference numeral 10 designates a barge or a ship which moored at an appropriate position between the proximity of the position of installation of the shore crane 7 and the offshore. The specific location is determined with respect to the water level.

Figure 4:
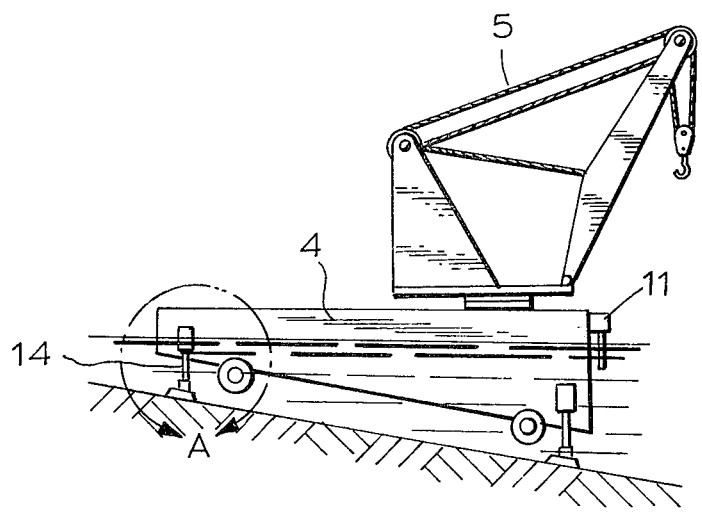
FIG. 4 is a side view of the crane truck as shown in FIG. 3.
Figure 5:
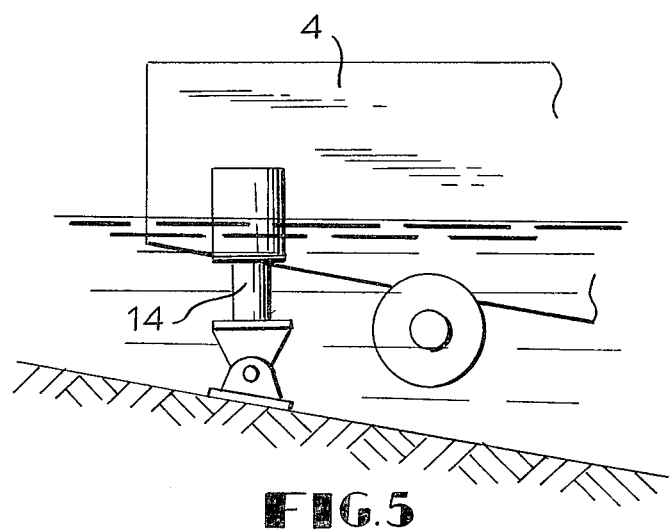
FIG. 5 is an enlarged plain view of a portion encircled by line A in FIG. 4.

With reference to FIGS. 3 to 5, reference numeral 11 designates a water level detector mounted on the crane truck 4, which detects the water level so that the crane truck 4 can be positioned at of the most suitable depth for facilitating the cargo handling work, and when the detector has detected the most suitable depth, it sends a command to the winch 8 whereby the movement of the crane truck 4 is stopped. Reference numeral 12 designates outriggers, each of which has an outrigger mounting arm 13 provided at the front and rear portions of the respective sides of the crane truck 4. Each arm 13 is retractable in the direction which is at a right angle to the running direction of the crane truck 4 by the use of hydraulic means or other appropriate means. Also, each outrigger 12 has a well-known jack device or means 14 (See FIGS. 4 and 5) which is retractable and is disposed vertically at the free end of said arm 13. It is to be noted that in place of the outriggers 12, the jack devices or means 14 could be directly mounted to the crane truck 4 at the respective side positions at the front and rear portions of the crane truck 4.

Figure 6:
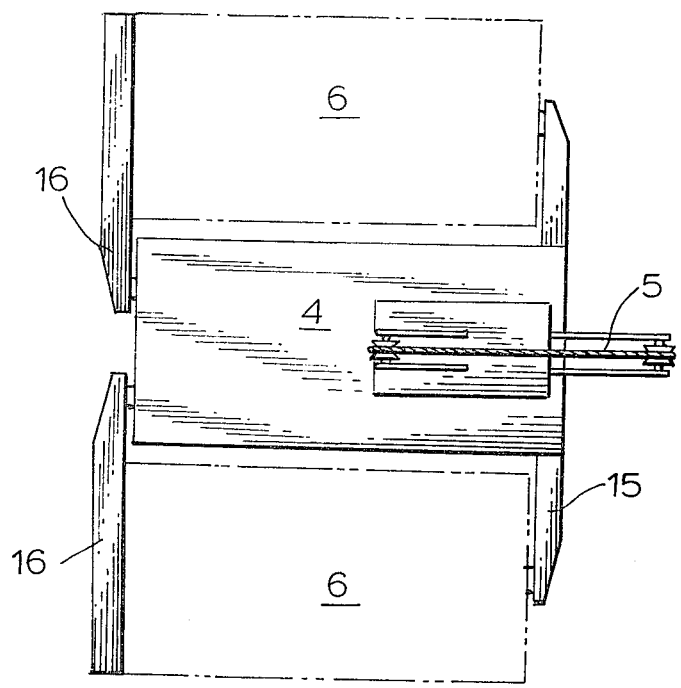
FIG. 6 is a top plain view showing a state where a crane truck and a cargo transportation truck of the present invention are positional and held stopped in a laterally aligned relationship.
Figure 7:
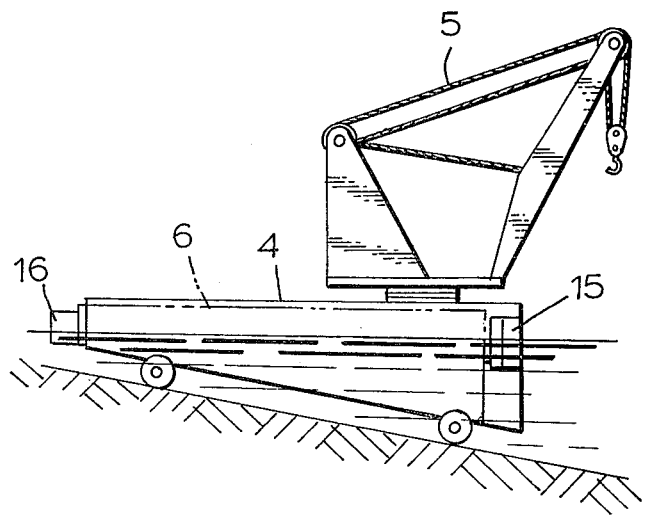
FIG. 7 is a side view of the apparatus according to the present invention as shown in FIG. 6.

Referring now to FIGS. 6 and 7, reference numeral 15 designates stop brackets projected from the opposite sides of the crane truck 4 at its side end facing the water, and the brackets 15 serve as stoppers for the cargo transportation trucks 6. In place of the brackets 15, brackets 16 could be provided on the respective cargo transportation trucks 6 at their respective sides facing the wharf so as to project inwardly toward the crane truck 4 as shown in FIG. 6. If the brackets 15 and 16 are both provided on the crane truck 4 and the cargo transportation trucks 6, respectively, then the cargo transportation trucks 6 can be stopped more precisely at the sides of the crane truck 4.

While the water level detector 11 is used to determine the stop position of the crane truck 4 in the above-described embodiment, in place thereof a line representing a predetermined water line could be painted around the outer periphery of the crane truck 4 so that the appropriate position of the crane truck 4 can be visually acknowledged by an operator of the crane truck thus enabling the crane truck 4 to be stopped at that position corresponding to the predetermined water line.

Also it is to be noted that in the above-described embodiment when a ship or a barge 10 is moored to the crane truck 4, the mooring is accomplished by making use of well-known capstans or bollards provided on the crane truck 4.

In operation of the cargo handling equipment constructed as described above, firstly the crane truck 4 is moved along the rails 3 towards the offshore by releasing the winch 8, and after the water level detector 11 has detected a suitable water level for the cargo handling, the winch 8 is braked so as to stop the crane truck 4 on the rails at a position corresponding to the detected suitable water level. Subsequently, either the crane truck 4 is fixed to the rails 3 by well-known clamp means (not shown), or after the crane truck 4 has been stopped, the outrigger mounting arms 13 are extended an appropriate length and then the jack devices or means 14 are actuated to fixedly secure the crane truck 4 at the position located on the path 2 along the wharf sloped surface.

Then, a barge or ship 10 is moored via capstans or bollards provided on the crane truck 4.

Once the position of the crane truck 4 has been established in the above-described manner, cargoes which have been transported by freight cars or trucks are transferred to one of the cargo transportation trucks 6 by means of the crane 7. When loaded, the truck 6 is moved along the rails 3 to the position of the crane truck 4 by operating the winch 9, and the cargo transportation truck 6 is stopped and thereby positioned aside the crane truck 4 by means of the above-described brackets 15 and 16. Subsequently, the cargoes are loaded on the barge or ship 10 by the crane 5 located on the crane truck 4. On the other hand, during this loading onto the barge or ship 10, transfer of cargoes to the other cargo transportation truck 6 is performed by means of the crane 7, thus this cargo transportation truck 6 is waiting on the land side until the cargoes of the first mentioned cargo transportation truck 6 have been loaded on the barge or ship 10.

Then, while one cargo transportation truck 6 is drawn upward by one of the winches 9, the other cargo transportation truck 6 is moved downward to the side of the crane truck 4 by releasing the other winch 9.

Once a predetermined amount of cargoes have been loaded on the barge or ship 10 by alternately operating the cargo transportation trucks 6 as previously described, subsequent cargo handling work is temporarily interrupted until another barge or ship 10 is moored to the crane truck 4. And after all the cargo handling work has been completed, the crane truck 4 as well as the cargo transportation trucks 6 are drawn upward onto the land side by means of the winches 8 and 9.

According to the above-described embodiment, since the water level detector 11 is mounted on the crane truck 4, if the water level should vary as a function of the tide or other factors, the crane truck 4 could be shifted to and reset in accordance with the most appropriate position for the cargo handling work, and furthermore, the barge or ship 10 could then be moored directly to the crane truck 4 now in a reset position. Moreover, since the two cargo transportation trucks 6 can be alternately moved and operated between the moored barge or ship 10 and the crane 7 on the land side, even if the mooring position of the barge or ship should vary in accordance with the change of the water level, the cargo handling work could be achieved at a high efficiency. While the operation of the cargo handling equipment has been herein described above in connection with the loading cargoes onto the barge or ship, the unloading of cargoes from a barge or ship can be readily achieved by means of the above-described cargo handling equipment according to the present invention.

While one crane truck and two cargo transportation trucks are used in combination for the loading and unloading of one barge or ship in the above-described embodiment, only one cargo transportation truck could be used in combination with one crane truck. In addition, the aforementioned combination could be provided in multiple sets positioned along a wharf sloped surface whereby the sets could operate in parallel with each other, and in such a case the cargo handling work can be effected simultaneously in connection with a plurality of barges or ships, or in the case of a large ship, the cargo handling work can be effected simultaneously at front and rear positions or at a plurality of positions along the land facing side of the ship.

Furthermore, while the crane truck 4 and the cargo transportation trucks 6 are designed to run along the rails by means of the winches 8 and 9 in the above-described embodiment, these respective trucks could be constructed as self-motivating trucks, and in this case, by mounting an appropriate travel control means on the respective trucks, the movement of the respective trucks can be smoothly and safely controlled.

Since many alterations and changes could be made in the above described construction and many apparently widely differing embodiments of the present invention could be made without departing the scope thereof, it is intended that all matter contained in the above drescription or shown in the accompanying drawings shall be interpreted as being illustrative and not limiting with respect to the scope of the present invention.

What is claimed is:

1. A cargo handling apparatus used on a wharf having a sloped surface which extends downwardly from a shoreline into an adjacent body of water for loading or unloading cargoes associated with a vessel positioned in the body of water and moored such that the vessel is substantially adjacent to the wharf, said cargo handling apparatus comprising:
    at least one crane truck for traveling in a direction back and forth along the sloped wharf surface from a position along the shoreline to a position whereby it is partially submerged in the adjacent body of water adjacent to the vessel for loading and unloading cargoes associated with the vessel;
    at least one cargo transportation truck for being positioned along the shoreline and for traveling back and forth in a direction that is substantially parallel and adjacent to the traveling direction of said crane truck and for, when said crane truck is adjacent the vessel, being juxtaposed next to said crane truck for allowing said crane truck to load cargoes from the vessel thereon and for allowing said crane truck to unload cargoes thereon onto the vessel, and
    a shore crane positioned on the shoreline and operatively associated with said cargo transportation truck for, when said cargo transportation truck is positioned along the shoreline, loading cargoes therein and unloading cargoes therefrom.

2. A cargo handling apparatus as claimed in claim 1, wherein said crane truck has at least one jack means, said jack means having a portion which moveably extends and abuts the sloped wharf surface for, when said crane truck is in the partially submerged position, fixing said crane truck to the sloped wharf surface.

3. A cargo handling apparatus as claimed in claim 1, wherein said crane truck has a water level detector operatively associated therewith for determining the water level with respect to said crane truck whereby an operator can optimally position said crane truck with respect to the water level so as to facilitate the loading and unloading of cargoes.

4. A cargo handling apparatus as claimed in claim 1, wherein said crane truck has at least one stop bracket laterally extending therefrom in a direction substantially transverse to the direction of travel of said cargo transportation truck for abutting said cargo transportation truck and thereby stopping it when it is optimally juxtaposed next to said crane truck for facilitating respectively the loading and unloading of cargoes.

5. A cargo handling apparatus as claimed in claim 1, wherein said cargo transportation truck has at least one stop bracket laterally extending therefrom in a direction substantially transverse to the direction of travel of said cargo transportation truck for abutting said crane truck and thereby stopping said cargo transportation truck when it is optimally juxtaposed next to said crane truck for facilitating respectively the loading and unloading of cargoes thereon and therefrom said cargo transportation truck.

6. A cargo handling apparatus as claimed in claim 1, wherein said crane truck is self-motivating.

7. A cargo handling apparatus as claimed in claim 1, wherein said cargo transportation truck is self-motivating.

8. A cargo handling apparatus as claimed in claim 1, further comprising a first winch operatively associated with said crane truck for moving it in the back and forth direction.

9. A cargo handling apparatus as claimed in claim 1, further comprising a second winch operatively associated with said cargo transportation truck for moving it in the back and forth direction.

10. A cargo handling apparatus as claimed in claim 1, wherein said crane truck and said cargo transportation truck are respectively adapted to travel on rails.

* * * * *